(12) United States Patent
Lin (10) Patent No.: US 9,453,636 B2
(45) Date of Patent: Sep. 27, 2016

(54) LIGHTING STRUCTURE

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 286 days.

(21) Appl. No.: 14/108,781

(22) Filed: Dec. 17, 2013

(65) Prior Publication Data

US 2015/0167941 A1   Jun. 18, 2015

(51) Int. Cl.
| | |
|---|---|
| *F21V 1/06* | (2006.01) |
| *F21V 21/00* | (2006.01) |
| *G03B 15/02* | (2006.01) |
| *G03B 17/56* | (2006.01) |
| *F21W 131/40* | (2006.01) |

(52) U.S. Cl.
CPC .................. *F21V 21/00* (2013.01); *F21V 1/06* (2013.01); *G03B 15/02* (2013.01); *G03B 17/568* (2013.01); *F21W 2131/40* (2013.01)

(58) Field of Classification Search
CPC .............. F21V 1/02; F21V 1/04; F21V 1/06; F21V 17/04; F21V 17/06; F21V 21/00; F21V 15/012; F21V 19/0035; G03B 15/02; G03B 17/568
See application file for complete search history.

(56) References Cited

U.S. PATENT DOCUMENTS

| | | | | |
|---|---|---|---|---|
| 4,052,607 A | * | 10/1977 | Larson ................... | G03B 15/02 362/18 |
| 6,176,598 B1 | * | 1/2001 | Seligman .................. | F21V 7/18 362/278 |
| 7,497,603 B2 | * | 3/2009 | Malkanov ............... | F21V 17/10 362/16 |

* cited by examiner

*Primary Examiner* — Julie Bannan
(74) *Attorney, Agent, or Firm* — Lin & Associates Intellectual Property, Inc.

(57) ABSTRACT

The present invention relates to a lighting structure used in photographing or video recording. The lighting structure of the present invention includes four holders, which are disposed around a periphery of the lighting structure and are configured in a symmetrical manner with each other. At least one engaging member is formed between each one of the holder in a predetermined clockwise/counterclockwise direction. The lighting structure of the present invention can be assembled with a light cover. The light cover includes two intersecting supporting rods, which are corresponding to the engaging members. The two intersecting supporting rods can be engaged with the engaging members.

4 Claims, 9 Drawing Sheets

LIGHTING STRUCTURE

BACKGROUND OF THE INVENTION

1. Field of the Invention

The present invention relates to a lighting device used in photographing and video recording. More particularly, the present invention relates to a lighting structure having multiple engaging members, which can be assembled with a light cover having intersecting supporting rods.

2. The Prior Arts

There are several ways to assemble a lighting device with a light cover. The followings are some commonly used assembling methods:

A first type of commonly used assembling method is to assemble the light cover with the lighting device with latches. When using latches for assembling, a mounting frame is disposed on the lighting device, and the light cover is mounted onto the mounting frame with latches. The result of such assembling is very stable, however, the disassembling process thereof can be very time consuming. In addition, the latch structure has low durability, and is likely to deform or fracture after a time of usage. The assembling process is inconvenient as well.

A second type of commonly used assembling method is to assemble the light cover with the lighting device with jointing structures. When using jointing structures for assembling, a jointing structure is disposed on the lighting device and the light cover respectively. The jointing structure on the lighting device is assembled with the jointing structure on the light cover so as to assemble the lighting device and light cover together. However, due to the limitation of the structure of such lighting device, only one light source can be installed.

A third type of commonly used assembling method is to assemble the light cover with the lighting device with fasteners. At least one threaded hole is formed on the lighting device, and the light cover is accommodated with a base. A number of threaded holes are formed on the base corresponding to the number and position of threaded holes on the lighting device. When assembling, the base is inserted into the lighting device first, and the threaded holes on the two are aligned with each other. After the threaded holes are aligned, fasteners such as screws are engaged with the threaded holes so as to assemble the lighting device and light cover together. As described above, the assembling process can be quite complicated.

The three conventional assembling methods described above each have their own advantages and disadvantages. For example, the first type of conventional assembling method provides a fast assembling process, however, the latch structure used thereof has a low durability and is likely to deform or fracture after a time of usage. The lighting device using the second type of conventional assembling method can only be installed with one light source due to its structure limitation. Lastly, the process of the third type of assembling methods is more complicated, and the lighting device cannot be quickly assembled with or disassembled from the light cover.

SUMMARY OF THE INVENTION

Based on the above reasons, a primary objective of the present invention is to provide a lighting device which can be quickly assembled with and disassembled from a light cover. The lighting device is configured to have multiple engaging members, so the user can quickly assemble the lighting device with a light cover, and can also quickly disassemble the lighting device from the light cover.

The lighting structure provided by the present invention is able to overcome the disadvantages brought by the conventional assembling methods between lighting devices and light covers, including: inconvenient disassembling process, low durability and incapability of providing multiple light sources.

In order to fulfill the above objectives, the lighting structure of the present invention includes four holders, which are disposed around a periphery of the lighting structure and are configured in a symmetrical manner with each other. At least one engaging member is formed between each one of the holder in a predetermined clockwise/counterclockwise direction.

With the engaging members, the user can simply turn the lighting structure clockwise or counterclockwise when assembling the lighting structure with a light cover. When doing so, the two supporting rods of the light cover is engaged respectively with the engaging members, thereby mounting the two supporting rods with the engaging members.

According to an embodiment of the present invention, four supporting rod fitting portions are formed on a side of the lighting structure, and are formed on the same side as the four holders corresponding to the four holders. The four supporting rod fitting portions intersect with each other at the center of the lighting structure, and the four holders are disposed between the four supporting rod fitting portions respectively. The four supporting rod fitting portions are for fitting the supporting rods of the light cover, and the supporting rods are allowed to slide within the supporting rod fitting portions. When the user turns the lighting structure in a clockwise/counterclockwise direction, the two supporting rods slide along the four supporting rod fitting portions to engage with corresponding engaging members. In this way, the stability between the lighting device and the light cover is improved.

Comparing with conventional lighting devise, the lighting structure provided by the present invention can be quickly assembled with and disassembled from the light cover. In addition, multiple light sources can be installed on the lighting structure provided by the present invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
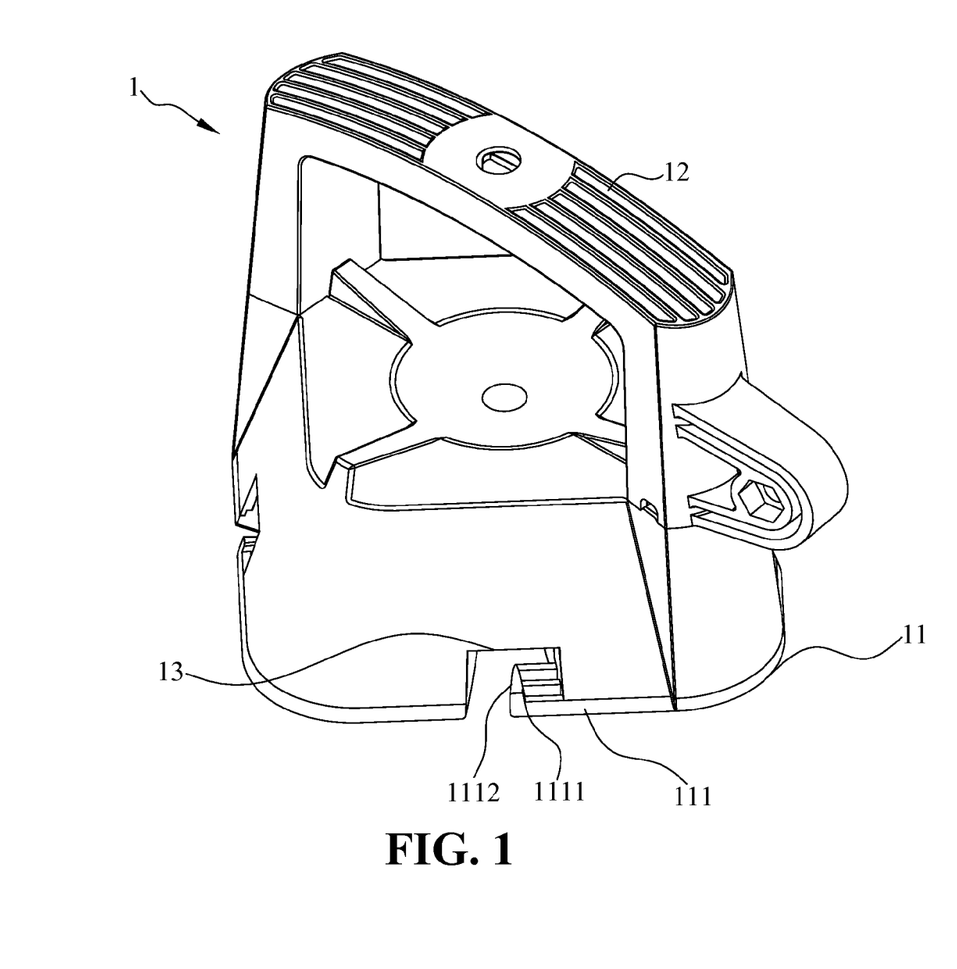
FIG. 1 is a perspective view showing a lighting structure of the present invention.

FIG. 1 is a perspective view showing the lighting structure 1 of the present invention. As shown in FIG. 1, the lighting structure 1 of the present invention includes four holders 11. The four holders 11 are disposed around a periphery of the lighting structure 1, and are configured in a symmetrical manner with each other. An engaging member 111 is formed between each one of the holder 11 in a predetermined clockwise/counterclockwise direction.

Figure 2:
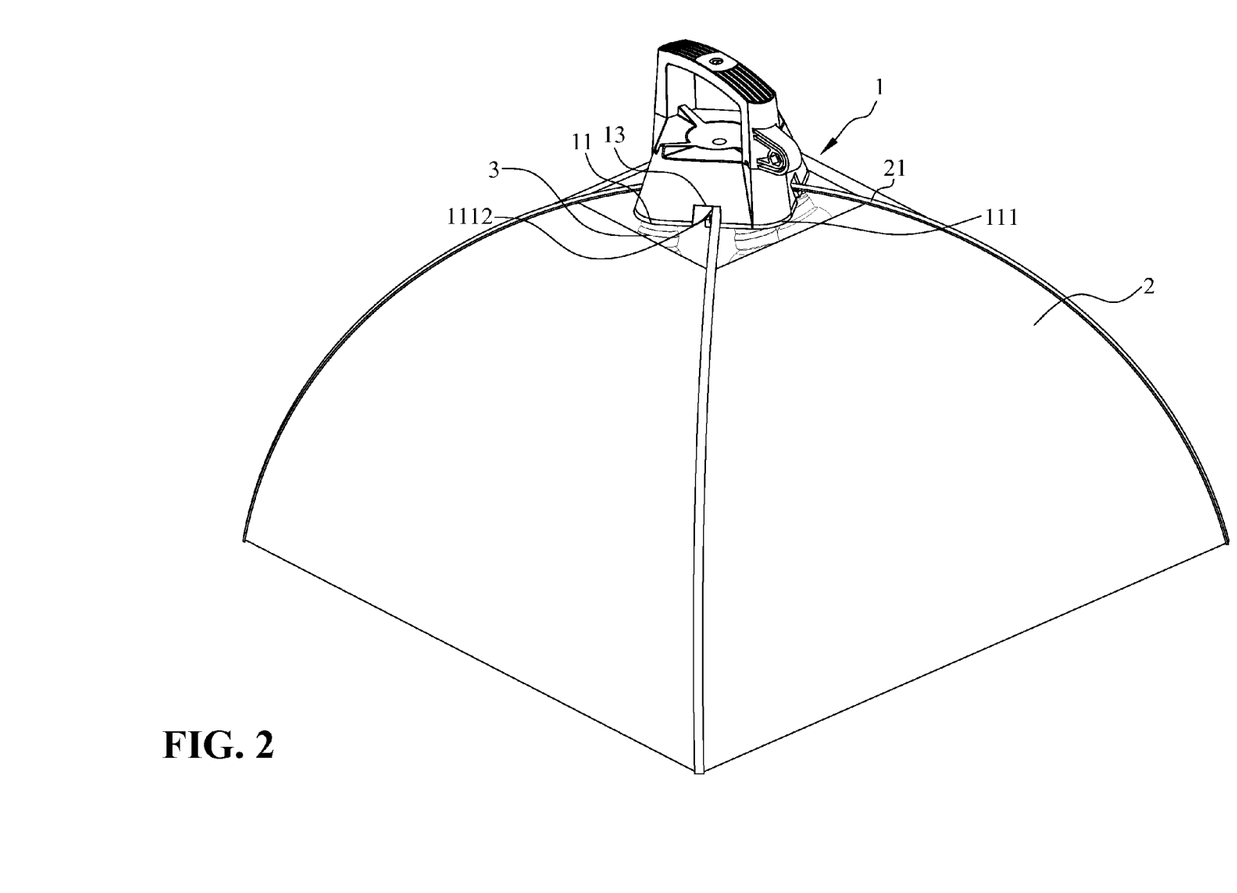
FIG. 2 is a perspective view showing an embodiment of the present invention, wherein the lighting structure is assembled with a light cover.

FIG. 2 is a perspective view showing an embodiment of the present invention, wherein the lighting structure 1 is assembled with a light cover. As shown in FIG. 2, the light cover 2 includes multiple exposed supporting rods 21. In order to assemble the lighting structure 1 of the present invention with the light cover 2, first, the lighting structure 1 is placed on the light cover 2 at an appropriate position. Then, the lighting structure 1 is turned in a predetermined direction so as to engage the supporting rods 21 with the four engaging members 111 correspondingly. In this way, the lighting structure 1 is quickly assembled with the light cover 2.

As shown in FIG. 2, a handle 12 is disposed on the lighting structure 1. With the handle 12, it is more convenient for the users to operate, move or assemble the lighting structure 1.

Figure 3:
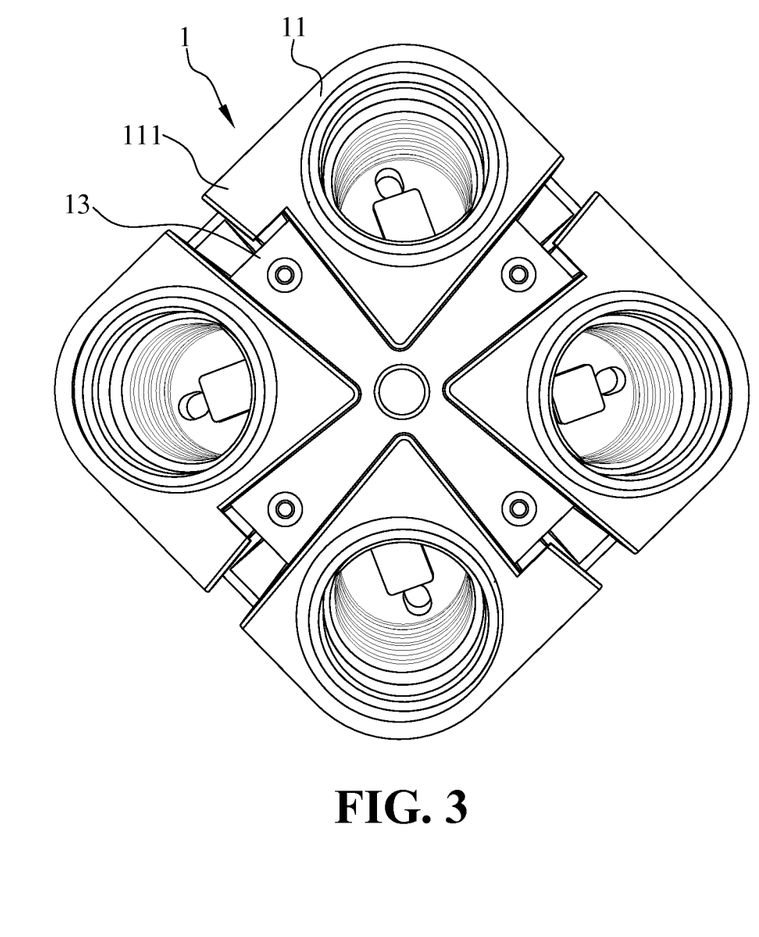
FIG. 3 is a bottom view showing the lighting structure of the present invention.

FIG. 3 is a bottom view showing the lighting structure 1 of the present invention. As shown in FIG. 3, the lighting structure 1 of the present invention is characterized in that the four holders 11 are disposed around a periphery of the lighting structure 1, and are configured in a symmetrical manner with each other. The engaging member 111 is formed between each one of the holders 11 in a predetermined clockwise/counterclockwise direction.

As shown in FIG. 3, four supporting rod fitting portions 13 are formed on a side of the lighting structure 1, and are formed on the same side as the four holders 11 corresponding to the four holders 11. The four supporting rod fitting portions 13 intersect at the center of the lighting structure, and the four holders 11 are disposed between the four supporting rod fitting portions 13 respectively. The four supporting rod fitting portions 13 are formed for fitting the supporting rods 21 of the light cover 2, and the supporting rods 21 are allowed to slide within the supporting rod fitting portions 13. When the user rotates the lighting structure 1 with respect to the light cover 2 in a clockwise/counterclockwise direction, the supporting rods 21 slide transversely along the four supporting rod fitting portions 13 to engage with corresponding engaging members 111 (as shown in FIG. 4), thereby preventing disengagement of the light cover 2 from the lighting structure 1.

Figure 4:
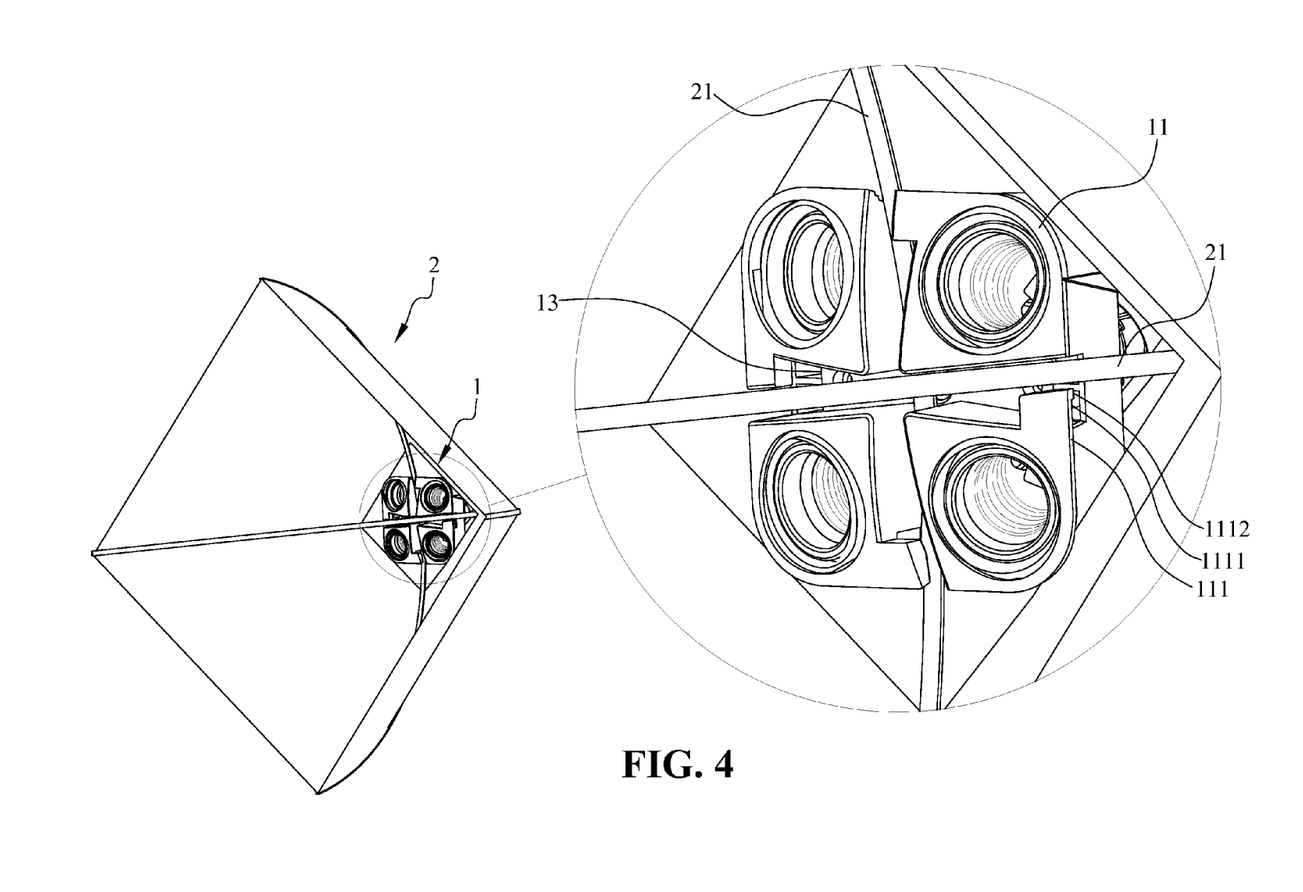
FIG. 4 is a perspective view illustrating a first step of the assembling process between the lighting structure of the present invention and the light cover.
Figure 5:
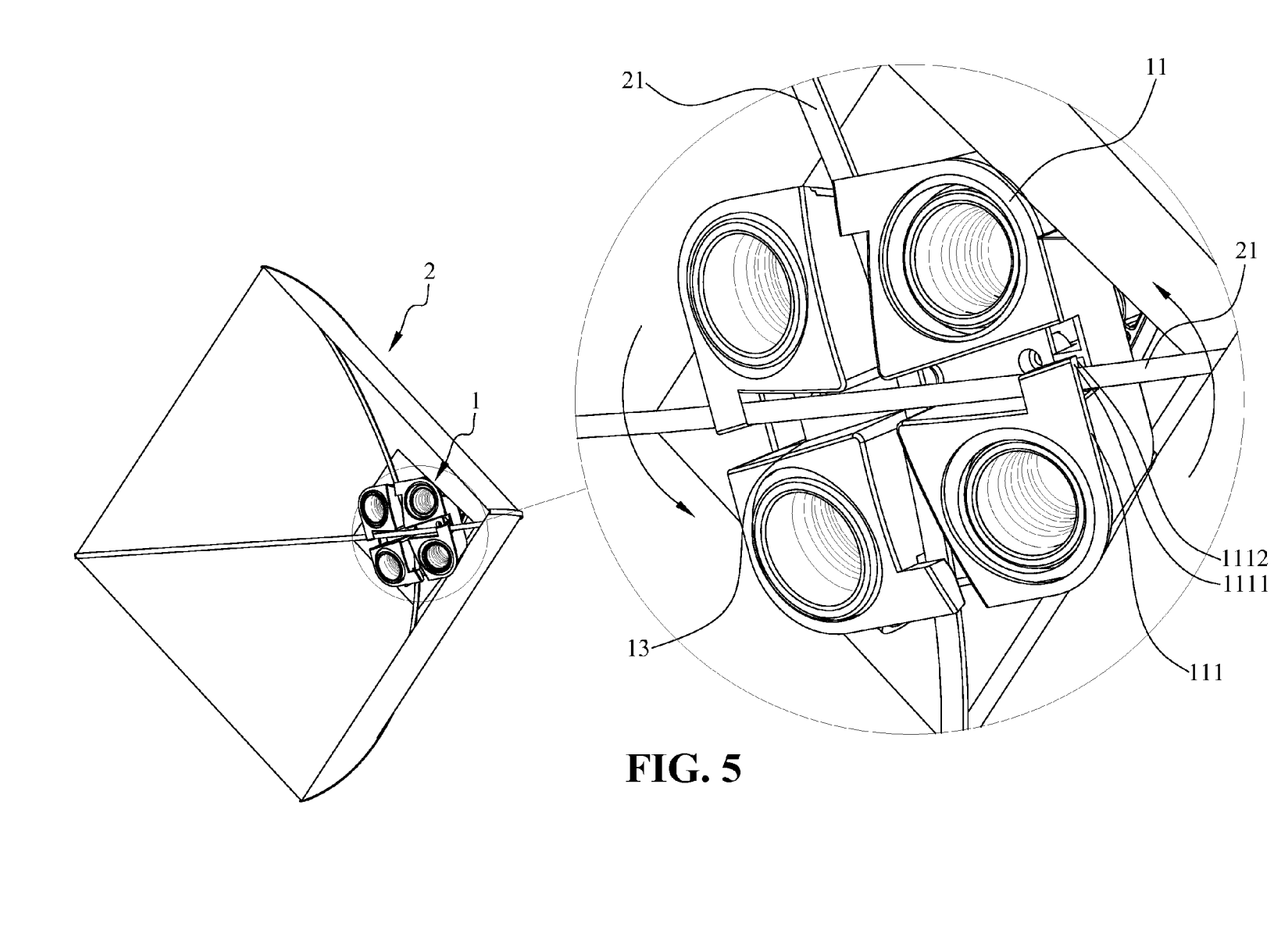
FIG. 5 is a perspective view illustrating a second step of the assembling process between the lighting structure of the present invention and the light cover.

FIG. 4 is a perspective view illustrating a first step of the assembling process between the lighting structure 1 and the light cover 2, and FIG. 5 is a perspective view illustrating a second step of the assembling process between the lighting structure 1 and the light cover 2. The following section is explained with reference to FIG. 4 and FIG. 5 simultaneously. When assembling the lighting structure 1 with a light cover 2, the two supporting rods 21 of the light cover 2 are able to fit inside the four supporting rods fitting portion 13 because the four supporting rods fitting portion 13 are configured to intersect with each other at the center of the lighting structure 1. The engaging members 111 are formed in a predetermined clockwise/counterclockwise direction along the edge of the holders 11. In this way, the supporting rods 21 of the light cover 2 are engaged with the engaging members 111 along the four supporting rod fitting portions 13. Due to the above nature of the lighting structure 1, first, the lighting structure 1 must be placed above the light cover 2 when assembling the lighting structure 1 with the light cover 2. The two supporting rods 21 are fitted into the four supporting rod fitting portions 13 correspondingly in preparation of the engaging step. Notably, the four holders 11 are disposed around the lighting structure 1, and each of the holders 11 is disposed between two supporting rod fitting portions 13 respectively.

FIG. 5 illustrates the second step of the assembling process between the lighting structure 1 and the light cover 2. As shown in FIG. 5, the two supporting rods 21 of the Light cover 2 are fitted in the four supporting rod fitting portions 13 correspondingly, and the four supporting rod fitting portions 13 are configured to intersect with each other at the center of the lighting structure 1. The engaging members 111 are formed in a predetermined clockwise/counterclockwise direction along the edge of the holders 11. When the lighting structure 1 is rotated with respect to the light cover 2 in a predetermined direction, the two supporting rods 21 slide transversely along the four supporting rods fitting portions 13 of the light structure 1 to engage with corresponding engaging members 111.

Figure 6:
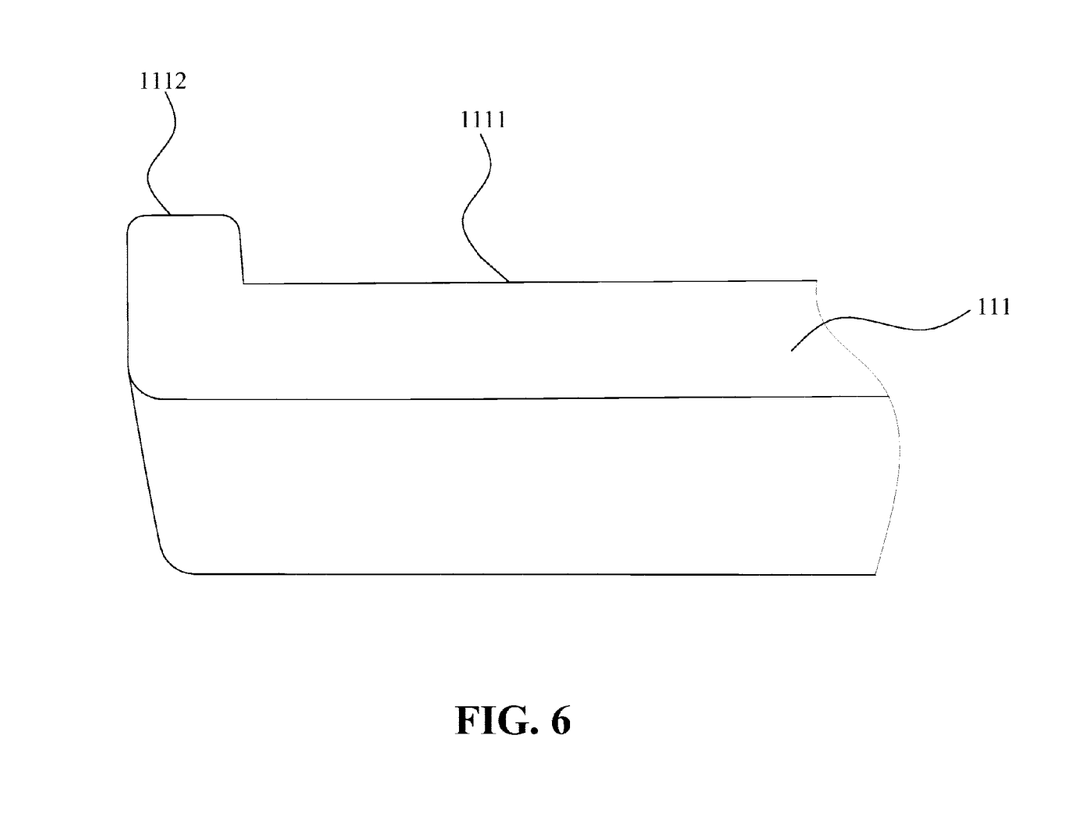
FIG. 6 is a perspective view showing an engaging member of the lighting structure of the present invention.

FIG. 6 is a perspective view showing an engaging member 111 of the lighting structure of the present invention. As shown in FIG. 6, a blocking member 1111 is disposed on each of the engaging member 111 at an end thereof, and a supporting rod mounting portion 1112 is formed by the blocking member 1111. The supporting rod mounting portions 1112 can be used to fix the two supporting rods 21. Next, the functions of the blocking member 1111 and the supporting rod mounting portion 1112 are explained in details with reference to FIG. 7~Fig. 9.

Figure 7:
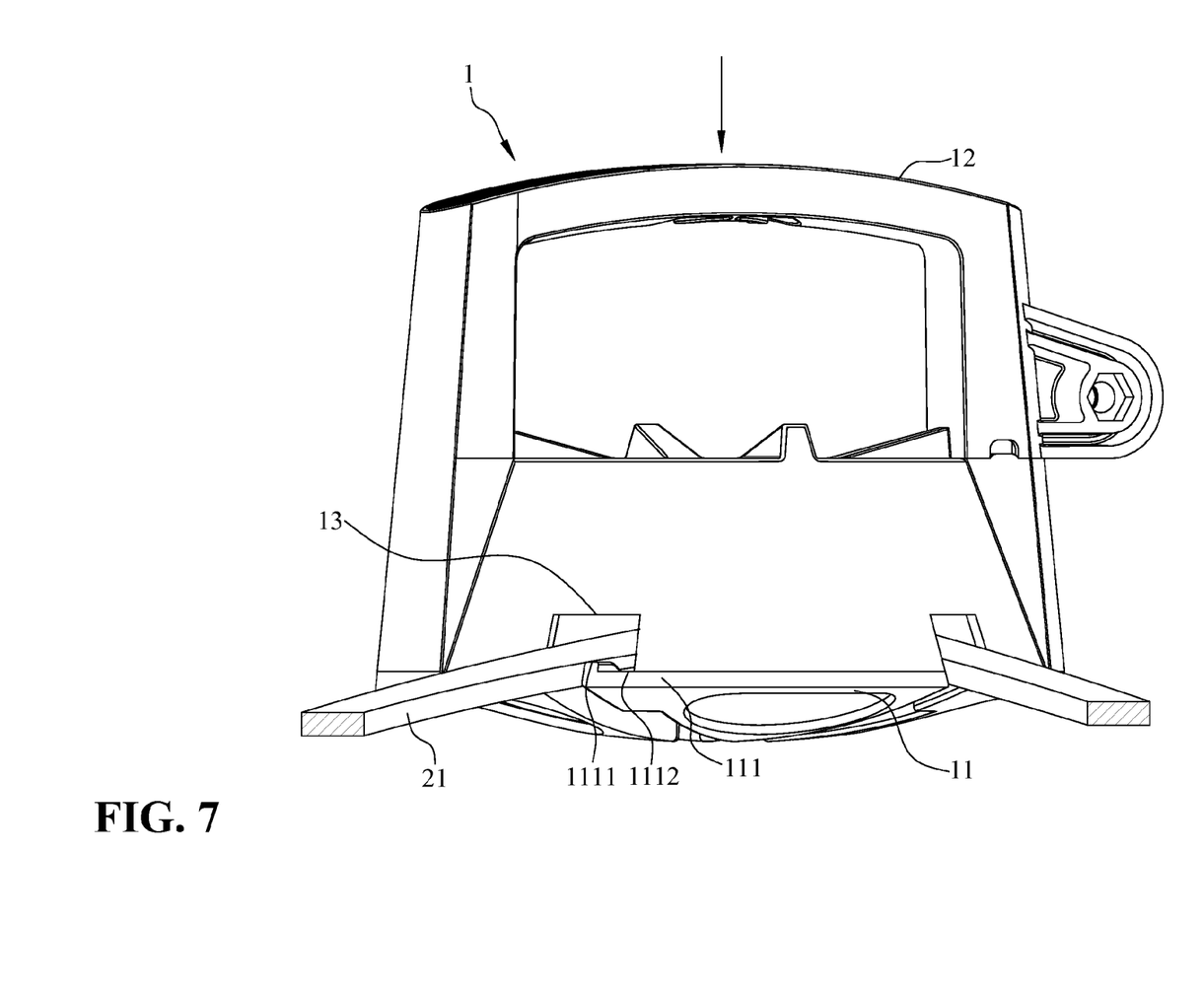
FIG. 7 is a perspective view illustrating a third step of the assembling process between the lighting structure of the present invention and the light cover.

FIG. 7 is a perspective view illustrating a third step of the assembling process between the lighting structure 1 and the light cover 2. As shown in FIG. 7, the two intersecting supporting rods 21 of the light cover 21 are bent into a curved shape. When the user applies a force in the downward direction indicated by the arrow in FIG. 7, the two supporting rods 21 deforms immediately, and the curvature of the two supporting rods decreases. In this way, when the lighting structure 1 is rotated with respect to the light cover 2 in a direction, the two supporting rods 21 are able to get pass the blocking member 1111.

Figure 8:
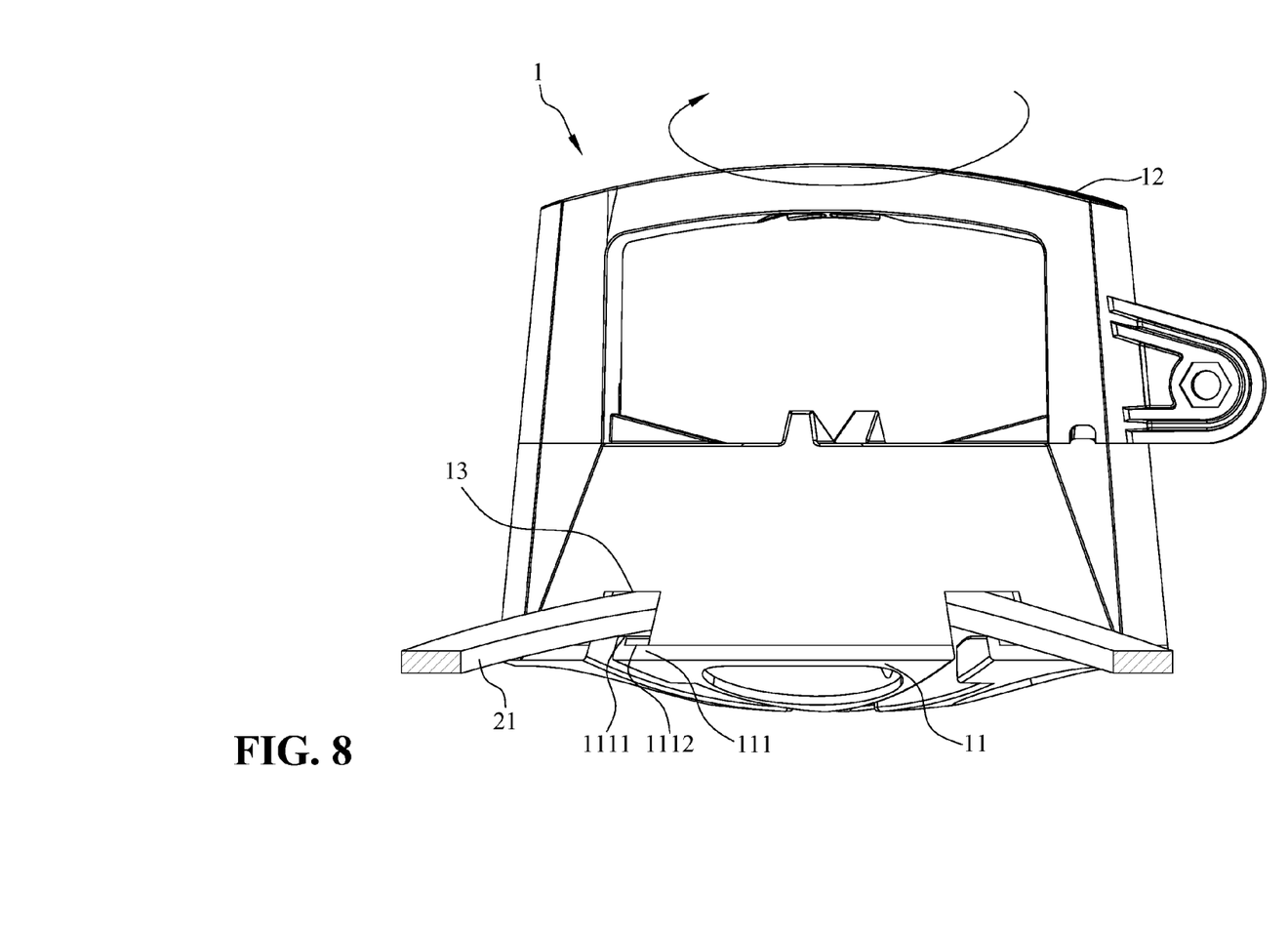
FIG. 8 is a perspective view illustrating a fourth step of the assembling process between the lighting structure of the present invention and the light cover.

FIG. 8 is a perspective view illustrating a fourth step of the assembling process between the lighting structure 1 and the light cover 2. In continuation with the third step shown in FIG. 7, the lighting structure 1 is rotated with respect to the light cover 2 in a direction as indicated by the arrow in FIG. 8 in the fourth step of the assembling process. After the lighting structure 1 is rotated with respect to the light cover 2, the two supporting rods 21 slide to a position corresponding to the engaging members 111 transversely of the four supporting rod fitting portions 13.

Figure 9:
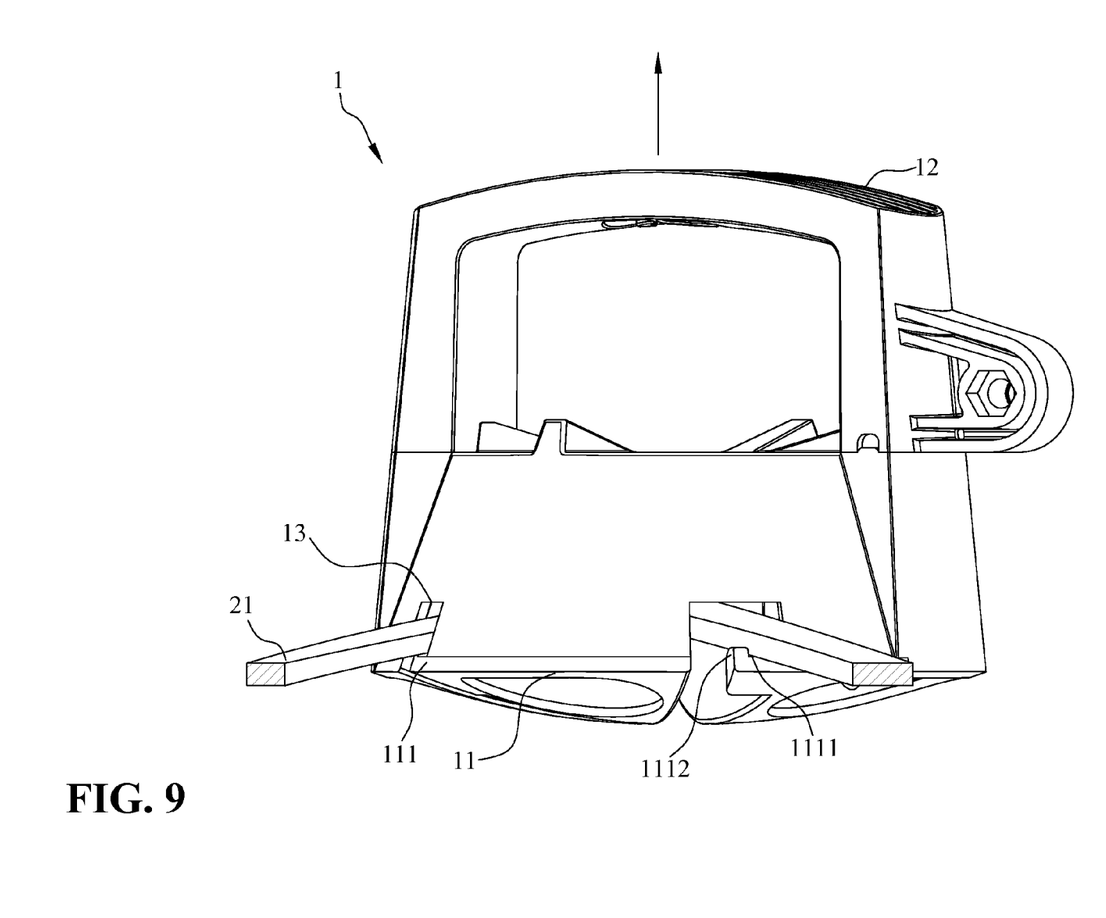
FIG. 9 is a perspective view illustrating a fifth step of the assembling process between the lighting structure of the present invention and the light cover.

FIG. 9 is a perspective view illustrating a fifth step of the assembling process between the lighting structure 1 and the light cover 2. Next, as shown in FIG. 9, after the two supporting rods 21 slide to the position corresponding to the engaging members 111 along the four supporting rod fitting portions 13, the lighting structure 1 is lifted by the elasticity of the supporting rods 21. The supporting rods 21 then return to their original shape, and the curvatures thereof are increased. In this way, the supporting rods 21 are engaged with the four supporting rod mounting portion 1112, and are restricted by the blocking member 1111 from leaving the supporting rod mounting portions 1112. With the engagement between the engaging members 111 and the supporting rods 21, the lighting structure 1 is assembled with the light cover 2.

Notably, the light cover 2 mentioned in the present invention can be a light reflector or a soft box.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A lighting structure adapted to be coupled with a light cover, which has at least two intersecting supporting rods, the lighting structure, comprising:

four holders, being disposed around a periphery of the lighting structure and being configured in a symmetrical manner with each other, wherein at least one engaging member is formed between each one of the holders in a predetermined clockwise/counterclockwise direction; and wherein, the two supporting rods of the light cover intersect relative to each other at a center of the lighting structure in such a manner that rotation of the lighting structure with respect to the light cover in a direction results in engagement of the supporting rods with the corresponding engaging members of the lighting structure, thereby preventing disengagement of the light cover from the lighting structure.

2. The lighting structure according to claim 1, wherein four supporting rod fitting portions are formed on a side of the lighting structure, and are formed on the same side as the four holders corresponding to the four holders;

wherein, the supporting rods are received in the four supporting rod fitting portions and intersect at the center of the lighting structure, and the four holders are disposed between the four supporting rod fitting portions respectively.

3. The lighting structure according to claim 1, wherein a blocking member is disposed on each of the engaging members at an end thereof, and a supporting rod mounting portion is formed by the blocking member.

4. The lighting structure according to claim 1, wherein a handle is disposed on the lighting structure.

* * * * *